Feb. 18, 1936.　　　　D. MILLER　　　　2,031,326
MORTAR MIXER
Filed April 25, 1932　　　3 Sheets-Sheet 1
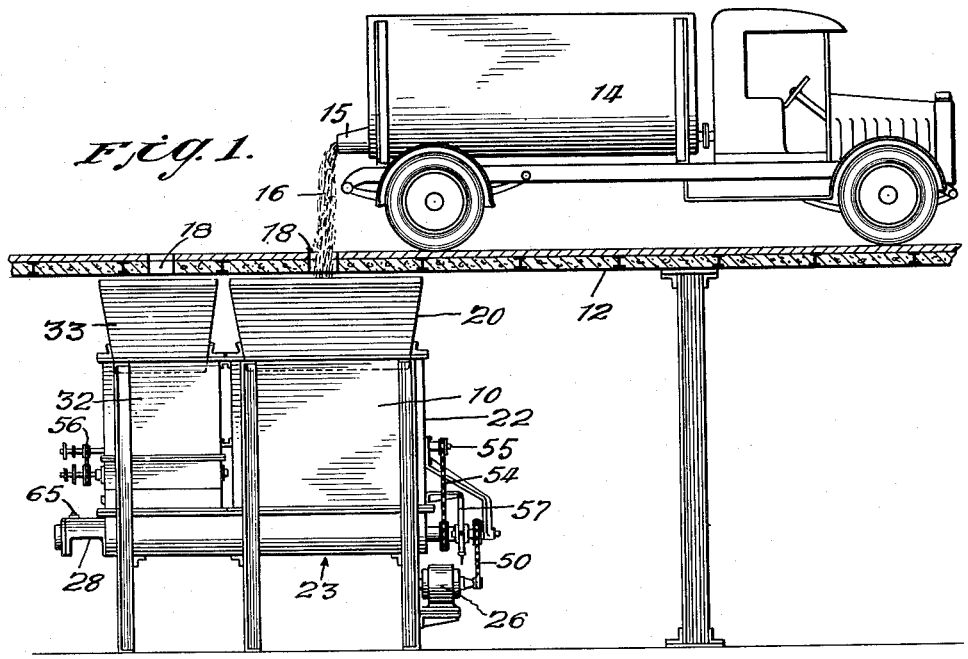
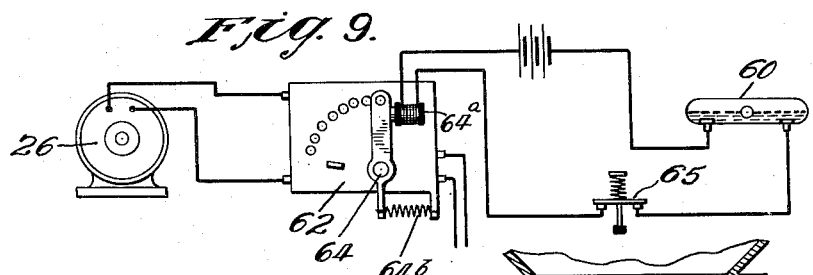
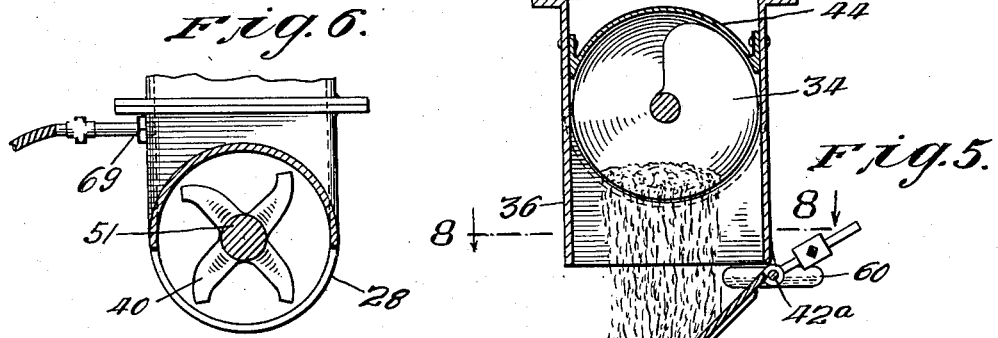
INVENTOR
Durando Miller
BY
ATTORNEYS

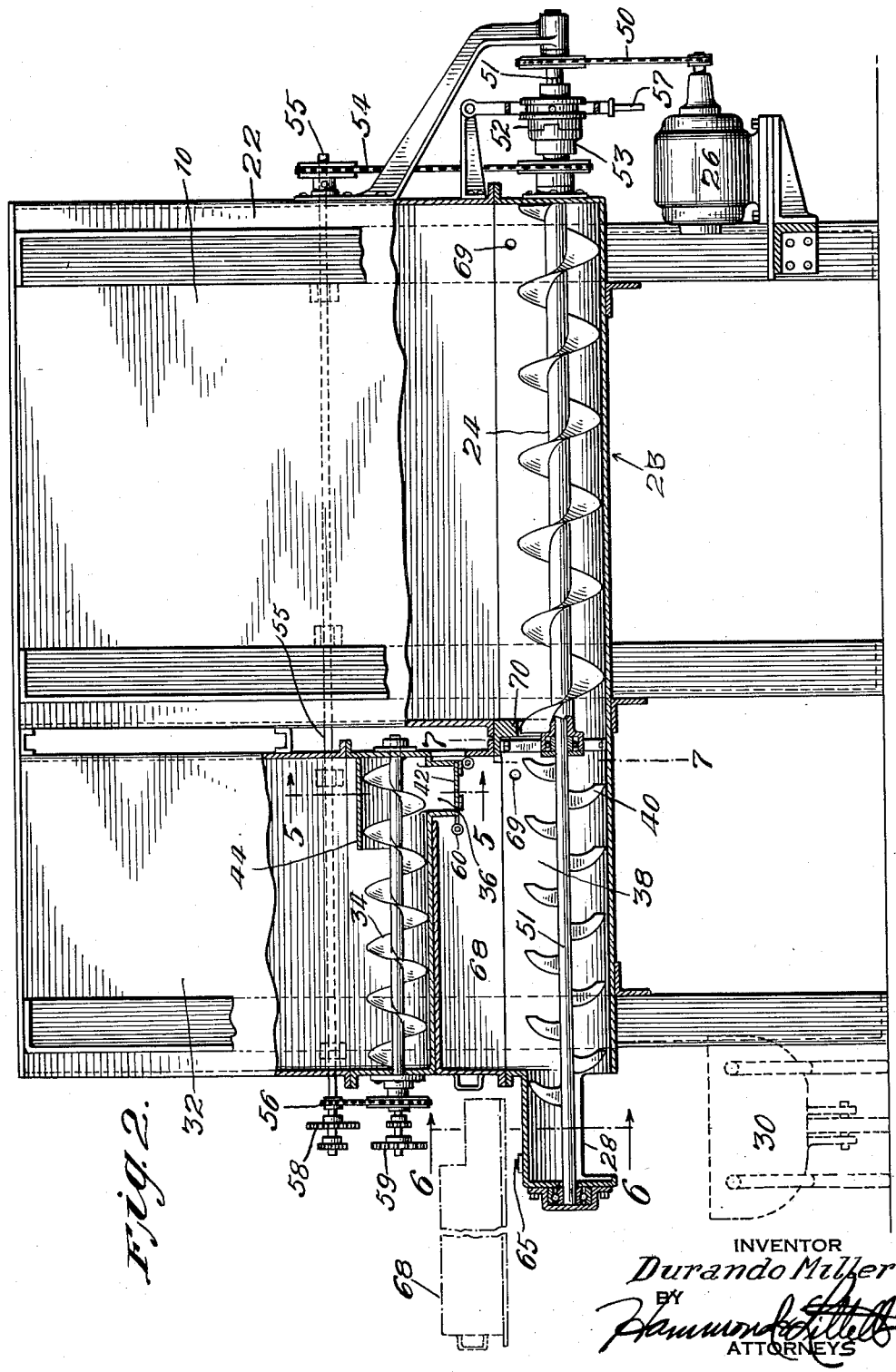

Feb. 18, 1936. D. MILLER 2,031,326
MORTAR MIXER
Filed April 25, 1932 3 Sheets-Sheet 3
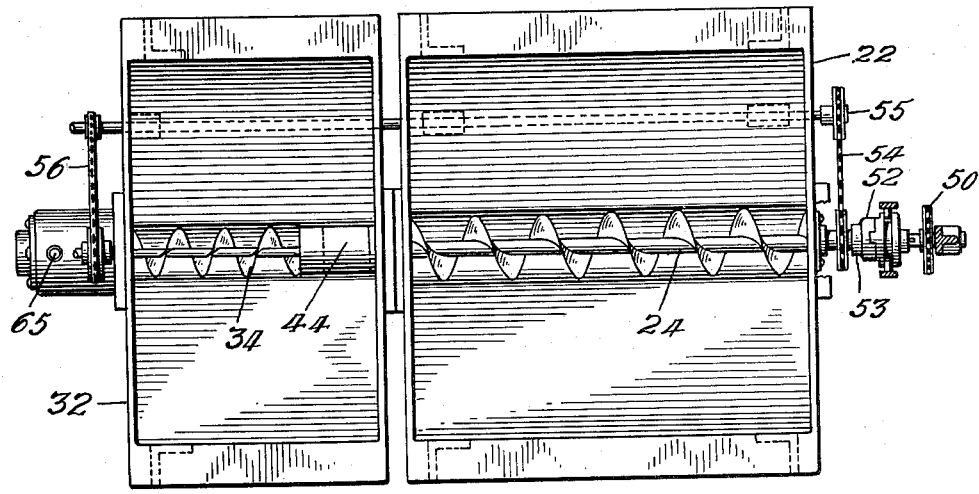
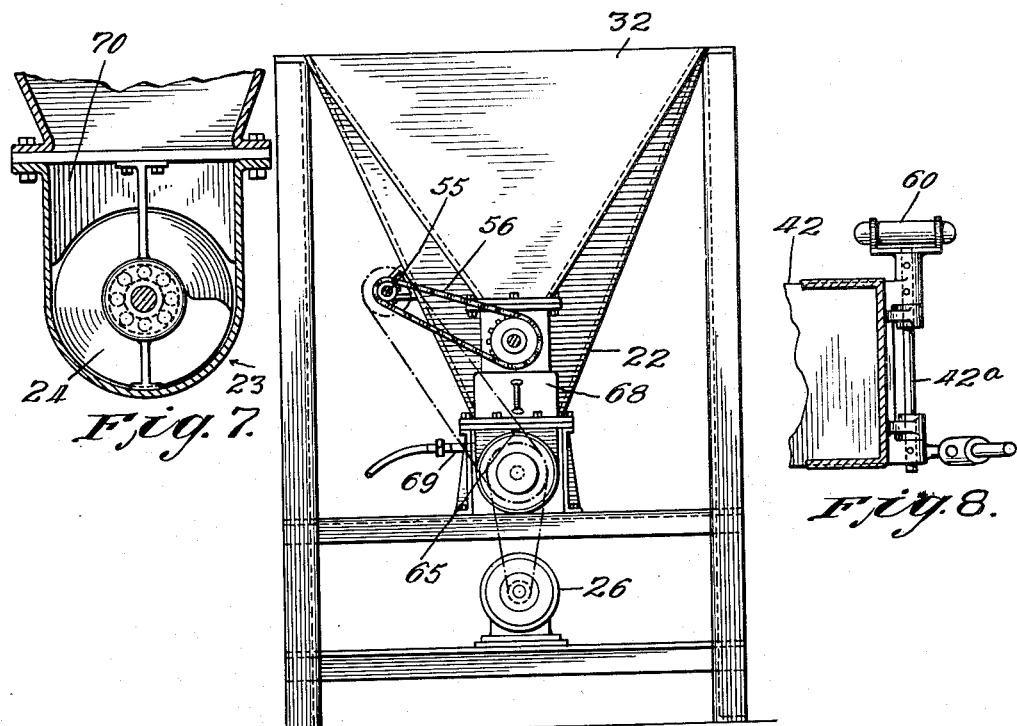
INVENTOR
Durando Miller
BY
Hammond Littell
ATTORNEYS Patented Feb. 18, 1936

2,031,326

UNITED STATES PATENT OFFICE 2,031,326

MORTAR MIXER

Durando Miller, Pelham Manor, N. Y.

Application April 25, 1932, Serial No. 607,382

3 Claims. (Cl. 83—73)

This invention relates to improvements in the method of and apparatus for use in handling and mixing mortar and similar building materials.

The requirements of present day building operations are such that the large quantities of mortar and like plastic materials used can more economically be supplied premixed in truck load lots, from a plant having effective mixing equipment and suitable storage space.

The mortar as delivered is a wet mixture of suitably aged slacked lime and sand to which before use cement is usually added in proportions varying with the use. It is important that cement should be added only at the time of use for the reason that the cement sets if too long an interval intervenes after the wetting thereof.

It is also important that the cement should be added in proper proportion, for too little will cause inferior work and too much involves useless expense and in some cases unsatisfactory results.

The present invention has for its principal object to provide an apparatus adapted to receive bulk quantities of lime mortar and of cement and besides to mix the necessary cement with the lime mortar as the material is required, whereby the lime mortar can be kept for an indefinite period in moist condition and mixed with cement and delivered as necessary.

Another object is to provide a device particularly adapted to receive truck load lots of ready mixed lime mortar or other similar materials which may be dumped directly from the truck into the apparatus for regulated delivery to smaller trucks or wheelbarrows.

A further object of the invention is to provide a system for economically and readily supplying lime and cement mortar for brick work, plaster and similar construction by which truck loads of the respective substances can be delivered into suitable hoppers from which these materials will be fed in suitable proportions and mixed, suitable automatic controls being provided whereby accidental variations in the fixed proportion and other results of human carelessness are reduced to a minimum.

The invention is further designed to provide an automatic control so insuring the regulated delivery of the respective ingredients of a plastic mass as to stop the delivery of all ingredients upon the failure of one.

Another object is to provide an apparatus for delivering automatically controlled ready mixed unit quantities of lime cement mortar from batch deliveries, which apparatus will require a minimum of manual labor or control.

Further objects and advantages of this invention will appear from the following description thereof taken in connection with the attached drawings which illustrate a preferred form of embodiment and in which:

Figure 1 is a diagrammatic side elevation showing the relative location of a delivery truck and the apparatus to be described;

Figure 2 is an elevational view with parts of the mixing apparatus broken away to show the interior construction;

Figure 3 is a top plan view of the hopper shown in Figure 2;

Figure 4 is an end elevation of the hopper shown in Figure 2;

Figures 5, 6 and 7 are detailed vertical sectional views taken on the lines 5—5, 6—6, and 7—7 of Figure 2 respectively;

Figure 8 is a horizontal section through the cement hopper chute taken substantially on the line 8—8 of Figure 5, and;

Figure 9 is a schematic wiring diagram of the apparatus.

The apparatus shown in the drawings for the purposes of illustration provides for the convenient discharge of truck load lots of wet mixed and aged lime mortar and of dry cement. The apparatus may be arranged to receive such materials from trucks driven into the first floor of a building in which the apparatus is installed. As indicated in Figure 1, a mortar mixer 10 is installed directly beneath the ground level floor 12, so that a truck 14 may drive into the building as in common practice and discharge the lime mortar 16 through suitable openings 18 in the floor directly into auxiliary hoppers 20 built about the mortar mixer. As such trucks are usually provided with a chute 15 through which the material is discharged, it is to be understood that all manual handling of the mortar will be avoided by merely driving the truck into the building and discharging the entire truck load.

The mortar mixer 10 illustrated in Figure 2 in greater detail is preferably provided with a mortar receiving chamber or hopper 22 which as shown in Figure 4 is relatively deep and sufficiently V shaped for effective operation. The bottom 23 is of cylindrical channel shape and is provided with a screw conveyor 24 which may be driven in any suitable manner from the motor 26. As the screw conveyor 24 is rotated the mortar will be discharged from the end of the storage chamber 22 through the shield 70 which limits the discharge to the capacity of the screw and finally, the mortar will be discharged through the discharge outlet 28, and as the screw conveyor will have a definite pitch, it may be so controlled that a definite number of turns of the screw, will discharge a predetermined amount of mortar into the receptacle or wheelbarrow 30.

In construction work cement is usually added to the mortar at the job and it is therefore desirable to provide a cement receiving receptacle 32 which may similarly have a false hopper 33 to be filled directly from the street level floor. Bulk cement, ordinarily dry cement, may be delivered in truck load lots and such hopper will cooperate with the mixer hopper 32 to hold an entire lot. As shown in Figure 4 the cement hopper 32 is similarly substantially V shaped with a cylindrical channel bottom and is similarly provided with a discharge screw 34. The screw 34 will discharge in the opposite direction to the screw 24 and will discharge cement through the chute 36 into a mixing chamber 38 which is provided with a paddle type of mixer 40. The cement chute 36 is provided with a pivoted door 42, the operation of which will be discussed hereinafter.

If desired the cement hopper 32 may be divided by partitions with two compartments so that both lime and cement may be delivered therefrom in measured amounts.

The cement hopper 32 is provided with a shield or cover 44 of semi-cylindrical shape positioned over the discharge end portion of the screw 34 to prevent the direct passage of cement through the cement chute 36 and to insure the passage of a predetermined amount of cement out of the chute at each turn of the screw. The construction of this cover may be as shown in Figure 5 for example.

Referring again to Figure 2 the motor 26 may be connected by means of a chain 50 or other gearing to the main shaft 51 which drives the paddle mixer 40. The shaft 51 also carries the clutch member 52 which drives the clutch member 53 and through the chain 54, the counter shaft 55 which extends to the extreme end of the mixing device, at which point it is connected by means of a chain 56 or similar gearing to the cement conveyor screw 34. The clutch member 53 is also directly secured to the hollow shaft of the mortar measuring and discharge screw 24. The clutch lever 57 is arranged to operate the clutch member 53.

The operation of the device is as follows: The mortar hopper 22, and the cement hopper 32 being filled, the motor is started with the clutch engaged so that the screw conveyor 34 measures and discharges cement and the screw conveyor 24 discharges predetermined amounts of lime mortar simultaneously into the mixing chamber 38 and in the proportions depending upon the gear ratio. As the material is discharged into the mixing chamber 38 the paddle 40 thoroughly intermixes the substances and slowly moves the material toward the discharge chute 28. This is the preferred construction by which the mortar is mixed simultaneously by the operation of the feed screws and the mixing paddle, the blades of the mixing paddle being curved to facilitate said discharge from the mixing chamber. After a sufficient amount has been delivered the clutch lever 57 is thrown to disengage the clutch member, thereby simultaneously stopping the mortar feed screw 24 and the cement feed screw 34. The mixing paddle continues to rotate, however, as long as the motor operates continually discharging the mixed mortar and cement until the mixing chamber is empty. By means of a suitable electric switch 65 the motor may then be stopped as well.

In order to proportion the ingredients discharged into the mixing chamber, it is necessary to properly control the rate of rotation of the two screws 24 and 34. This may be done by the proper use of gears 58 and 59 over which the chain 56 operates as is well known in the art. Other arrangements may also be used as desired, it being possible to change the mix of the respective ingredients from one proportion to another.

To insure the continuous delivery of cement in the proper amounts, the chute 36 is provided with a door 42 more clearly shown in Figures 5 and 8, in which the door is hinged to a suitable fixed hinged pin 42a on the end of which is carried an electric control 60. One diagrammatic method of operation of this control 60 is shown in Figure 9, in which the control 60 is shown as provided with a mercury switch, closing the circuit to the motor control rheostat 62 by holding the control lever 64 in position to close the circuit to the motor 26 through the medium of a suitable solenoid 64a. As long as the motor 26 is running and cement is being delivered through the chute 36, the door 42 is held open by the discharge from the chute. If after the motor starts, the cement does not immediately discharge from the screw 34, or if after starting the motor the flow of cement from the hopper 32 ceases due to the hopper not being kept full, the door 42 will close, thereby tilting the mercury control switch 60 and breaking the holding circuit through the solenoid 64a, permitting the motor control arm 64 to move under the action of spring 64b to the off position which stops the motor. The switch 65 adjacent the end of the discharge chute for the purpose of controlling the motor when sufficient material has been discharged into the wheelbarrow 30, may suitably be incorporated in this holding circuit. It is to be understood that this circuit and the manner by which the motor is stopped when cement ceases to flow through the chute 36 is purely diagrammatic and is susceptible to variations which are well known to the art. As the screws 24 and 34 are designed and driven to feed regulated and measured amounts of lime mortar and cement into the mixing chamber 38 and through the change gear control ratio 56, 58 and 59, can be regulated to deliver different ratios of cement. The automatic stopping of the apparatus when the flow of cement through the chute 36 ceases, prevents the making of improper mixes, so that once the gear ratio for a particular job has been set according to specifications all mixes delivered from the machine will be of that ratio.

The door 42, by closing the outlet 36 also prevents the moisture in the mixing chamber from affecting the cement in the hopper when the cement is not being fed.

For the purpose of facilitating cleaning of the device a cover 66 is maintained over the mixing chamber 38 which, as illustrated in Figure 2 may be withdrawn to expose the paddles 40 and to facilitate repair or cleaning as desired. The channels through which the mortar is discharged are also provided with water connections 69 by which water may be introduced directly into the chambers if desired, to wash the chambers or to add the necessary water to the mix. It is to be understood, however, that water is normally introduced only into the mixing chamber 38, as the lime mortar is normally sufficiently moist to be conveyed by the screw 24. The shield 70 for the lime mortar and the shield 44 as shown in Figure 5 for the cement makes the screw conveyors proper measuring devices, so that the precise amount of material discharged may be controlled.

If cement is delivered in bags it is possible to remove the false hopper 33 and position a man adjacent the mixing compartment 32 so that the cement may be dumped into the mixing chamber as desired. Normally, however, it is preferred to use both compartments together as described.

While the apparatus has been described as operating with lime mortar and cement it would also be possible to mix other similar suitable materials such as dry sand, lime and cement, sand, cement and aggregate and by varying the size or operating speed of the conveyors to get any desired proportions in the mix, if an aggregate were used as in the making of concrete it would be necessary to provide a conveyor which would suitably carry the aggregate. The apparatus may also be used to dispense straight cement or straight lime mortar in measured quantities without any mixing operation.

While I have shown preferred forms of embodiment of my apparatus modifications may be made therein and changes of construction resorted to without departing from the spirit and scope of my invention.

I claim:

1. A material mixing apparatus comprising in combination a mixing chamber, a hopper for bulk material with an outlet discharging into the mixing chamber, a second hopper for bulk material discharging into the mixing chamber, a horizontal feed screw positioned in the bottom of the first hopper having a central tubular shaft, feed means in the bottom of the second hopper for feeding material to the mixing chamber, an agitator for mixing the ingredients of the mixing chamber co-axial with the feed screw of the first hopper and having a shaft extending through the tubular shaft of the feed screw, a driving means connected to the agitator shaft, a clutch and means controlled by said clutch for actuating both the feed screw and the feed means in synchronism to deliver materials to the mixing chamber in predetermined proportions.

2. A portable mortar mixer for receiving in temporary storage, proportionating, mixing and discharging a lime mortar consisting of hydrated lime and cement which comprises a plurality of hoppers, normally adapted to receive truck load lots of hydrated lime and cement respectively, and a mixing chamber below the cement receiving hopper and adjacent the end of the hydrated lime receiving hopper, proportionating feed screws in the bottom of the respective hoppers, a common drive means for said feed screws, means adjacent the discharge of the respective feed screws to accurately proportion the unit discharge per rotation of the respective feed screws and control means adjacent the discharge of the cement hopper controlling the feed screw driving means to stop the feed on failure of discharge from the cement hopper and a non-continuous mixing paddle in the mixing chamber normally driven in synchronism with the feed screw driving mechanism and means to separately stop the feeding mechanism of the feed screws while continuing the rotation of the mixing paddle whereby the mixing chamber will continuously rotate to mix and discharge the chamber after the feeding mechanism has stopped.

3. A portable material mixing unit of the class described, comprising in combination, a plurality of hoppers for bulk material, said hoppers being in side by side relation, feed screws in each of said hoppers for discharging proportionated quantities of material therefrom, and a mixing chamber in direct communication with one of said hoppers and a substantial continuation thereof, said mixing chamber having an opening therein in direct communication with said hopper to receive material discharged therefrom, another of said hoppers being above the mixing chamber and having an opening therein above the mixing chamber and adjacent the first mentioned opening whereby the respective feed screws will discharge materials into the same end of the mixing chamber, and an agitator in the mixing chamber to mix and progressively discharge mixed materials from the end opposite the receiving end of said mixing chamber and driving means connected to the agitator and to the respective feed screws, said driving means including clutched driving connections between a power source and the agitator whereby said agitator may be separately operated when said feed screws are declutched to prevent further feed.

DURANDO MILLER.